US009727145B2

(12) United States Patent
Murase et al.

(10) Patent No.: US 9,727,145 B2
(45) Date of Patent: Aug. 8, 2017

(54) DETECTING DEVICE AND DETECTING METHOD

(71) Applicant: FUJITSU LIMITED, Kawasaki-shi, Kanagawa (JP)

(72) Inventors: Taichi Murase, Kawasaki (JP); Takahiro Matsuda, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 51 days.

(21) Appl. No.: 14/569,913

(22) Filed: Dec. 15, 2014

(65) Prior Publication Data

US 2015/0253861 A1    Sep. 10, 2015

(30) Foreign Application Priority Data

Mar. 7, 2014   (JP) ................. 2014-045462

(51) Int. Cl.
| | |
|---|---|
| *G06F 3/00* | (2006.01) |
| *G06K 9/46* | (2006.01) |
| *G06F 3/01* | (2006.01) |
| *G06K 9/00* | (2006.01) |
| *G06T 7/20* | (2017.01) |
| *G06T 7/70* | (2017.01) |

(52) U.S. Cl.
CPC ............ *G06F 3/017* (2013.01); *G06F 3/00* (2013.01); *G06K 9/00355* (2013.01); *G06K 9/4652* (2013.01); *G06T 7/20* (2013.01); *G06T 7/70* (2017.01); *G06T 2207/10004* (2013.01); *G06T 2207/30196* (2013.01)

(58) Field of Classification Search
None
See application file for complete search history.

(56) References Cited

U.S. PATENT DOCUMENTS

| | | | | |
|---|---|---|---|---|
| 8,005,263 B2* | 8/2011 | Fujimura | ............... | G06F 3/017 379/52 |
| 2005/0238201 A1 | 10/2005 | Shamaie | | |

(Continued)

FOREIGN PATENT DOCUMENTS

| | | |
|---|---|---|
| JP | 2004-348303 | 12/2004 |
| JP | 2007-148663 | 6/2007 |
| WO | WO 2011/142313 A1 | 11/2011 |

OTHER PUBLICATIONS

Extended European Search Report issued Oct. 29, 2015 in corresponding European Patent Application No. 14196936.0.

(Continued)

*Primary Examiner* — Kent Chang
*Assistant Examiner* — Benjamin Morales Fernande
(74) *Attorney, Agent, or Firm* — Staas & Halsey LLP

(57) ABSTRACT

A detecting device includes a processor and a memory which stores a plurality of instructions, which when executed by the processor, cause the processor to execute: specifying a region of a hand from a captured image; deciding, based on a movement amount of a region specified by the specifying, a first region with a first movement amount and a second region with a second movement amount that is larger than the first movement amount; if a first region and a second region decided by the deciding are captured in a joined state, deriving a region that remains after removing the first region from the captured image; and detecting a predetermined site in an image of a region derived by the deriving.

9 Claims, 9 Drawing Sheets

(56) References Cited

U.S. PATENT DOCUMENTS

| | | | |
|---|---|---|---|
| 2011/0197263 A1* | 8/2011 | Stinson, III | G06F 3/011 726/4 |
| 2011/0267265 A1* | 11/2011 | Stinson | G06F 3/0304 345/157 |
| 2013/0044197 A1* | 2/2013 | Katsuyama | G06F 3/0425 348/77 |
| 2014/0241570 A1* | 8/2014 | Onen | G06F 3/017 382/103 |
| 2014/0300542 A1* | 10/2014 | Jakubiak | G06F 3/017 345/157 |
| 2014/0321718 A1* | 10/2014 | Wabgaonkar | G06K 9/78 382/115 |
| 2015/0026646 A1* | 1/2015 | Ahn | G06K 9/00201 715/863 |

OTHER PUBLICATIONS

Thomas Coogan et al., "Real Time Hand Gesture Recognition Including Hang Segmentation and Tracking", G. Bebis et al. (Eds.): ISVC 2006, LNCS 4291, pp. 495-504, 2006, Springer-Verlag Berlin Heidelberg 2006, XP019050681.

* cited by examiner

DETECTING DEVICE AND DETECTING METHOD

CROSS-REFERENCE TO RELATED APPLICATION

This application is based upon and claims the benefit of priority of the prior Japanese Patent Application No. 2014-045462, filed on Mar. 7, 2014, the entire contents of which are incorporated herein by reference.

FIELD

The embodiment discussed herein is related to a detecting device and a detecting method.

BACKGROUND

In the related art, there exists technology that inputs information by detecting a position indicated by a user from an image captured by a camera. For example, a recognition site, such as a finger on the user's hand, is recognized as the position indicated by the user. In such a case, for example, a skin color region is specified from an image captured by a camera, template matching is conducted on the skin color region to recognize a region of a hand, and the recognition site included in the region of a hand is detected. Related technology is described in Japanese Laid-open Patent Publication No. 2004-348303 and International Publication Pamphlet No. WO 2011/142313, for example.

SUMMARY

In accordance with an aspect of the embodiments, a detecting device includes a processor; and a memory which stores a plurality of instructions, which when executed by the processor, cause the processor to execute: specifying a region of a hand from a captured image; deciding, based on a movement amount of a region specified by the specifying, a first region with a first movement amount and a second region with a second movement amount that is larger than the first movement amount; if a first region and a second region decided by the deciding are captured in a joined state, deriving a region that remains after removing the first region from the captured image; and detecting a predetermined site in an image of a region derived by the deriving.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which.

DESCRIPTION OF EMBODIMENT

Hereinafter, practical examples of a detecting device and a detecting method according to an embodiment will be described based on the drawings. However, these practical examples are not limiting. Additionally, the respective practical examples may be appropriately combined insofar as the content of the process is not contradictory.

Practical Example 1

[Detecting Device Configuration]

Figure 1:
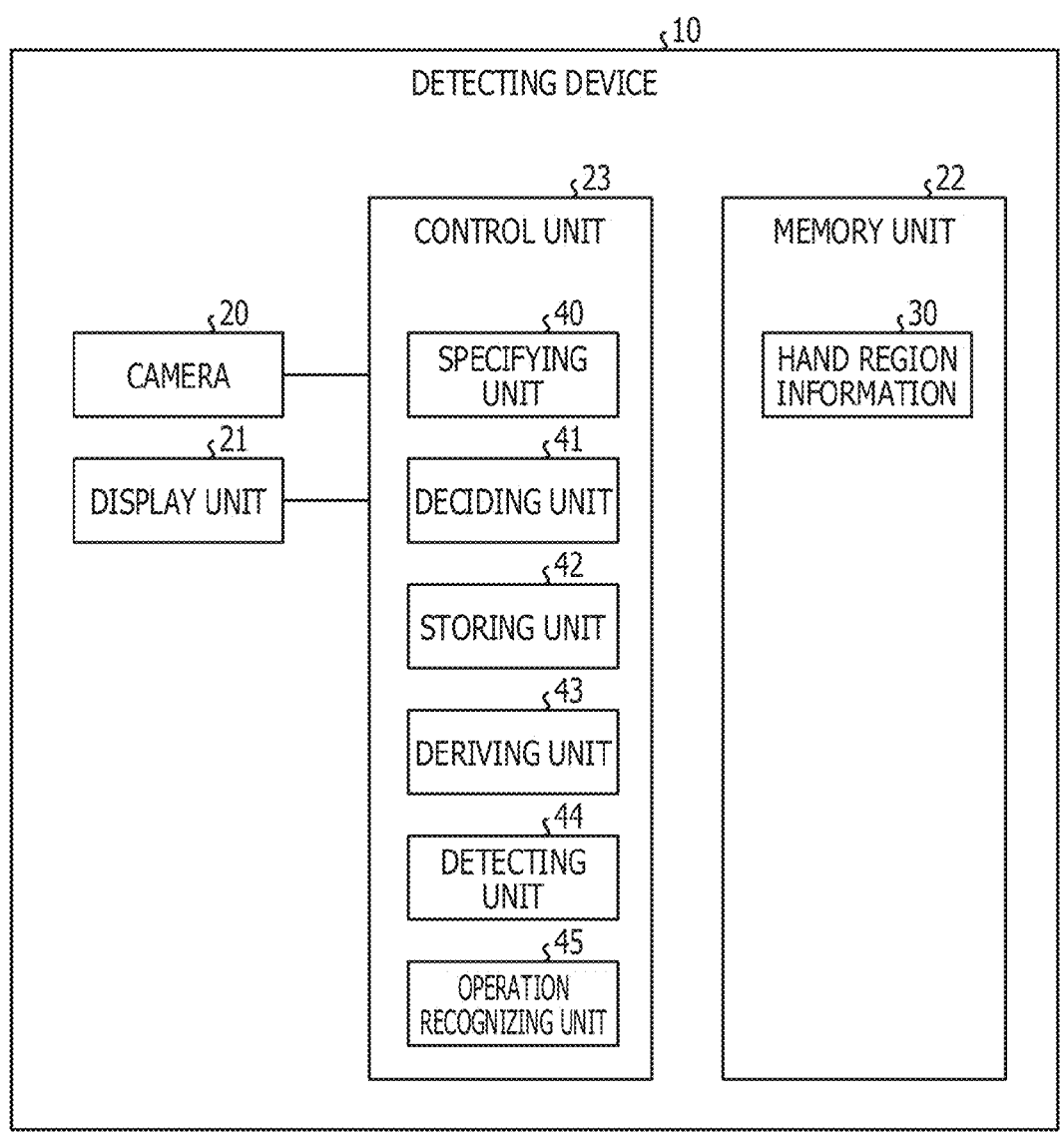
FIG. 1 is a diagram illustrating an example of a functional configuration of a detecting device.

A detecting device 10 according to Practical Example 1 will be described. FIG. 1 is a diagram illustrating an example of a functional configuration of a detecting device. The detecting device 10 is a device enabling the input of a user operation by detecting a position indicated by the user. For example, the detecting device 10 may be an information processing device such as a desktop personal computer (PC) or a notebook PC. In addition, the detecting device 10 may also be a mobile device such as a tablet, a smartphone, or a personal digital assistant (PDA), for example. As illustrated in FIG. 1, the detecting device 10 includes a camera 20, a display unit 21, a memory unit 22, and a control unit 23.

The camera 20 is an image capture device that captures a color image. The camera 20 captures an image periodically at a predetermined frame rate, and generates image information of the captured image. The frame rate may be any rate sufficient to capture a hand at multiple points when the user moves the hand to multiple points in order to perform an operating instruction. For example, the frame rate may be 24 frames per second (fps), 30 fps, or 60 fps. Note that multiple cameras 20 may also be provided.

The display unit 21 is a device that displays various information. The display unit 21 may be a display device such as a liquid crystal display (LCD) or a cathode ray tube (CRT). Note that the display unit 21 may also be a projecting device such as a projector that displays an image by projection. The display unit 21 displays various information. For example, the display unit 21 displays an operating screen that accepts user operations performed as gestures.

Note that the detecting device 10 may also include other equipment besides the above equipment. For example, the detecting device 10 may also include an input unit that accepts operating input from the user, such as a mouse and keyboard.

Figure 2:
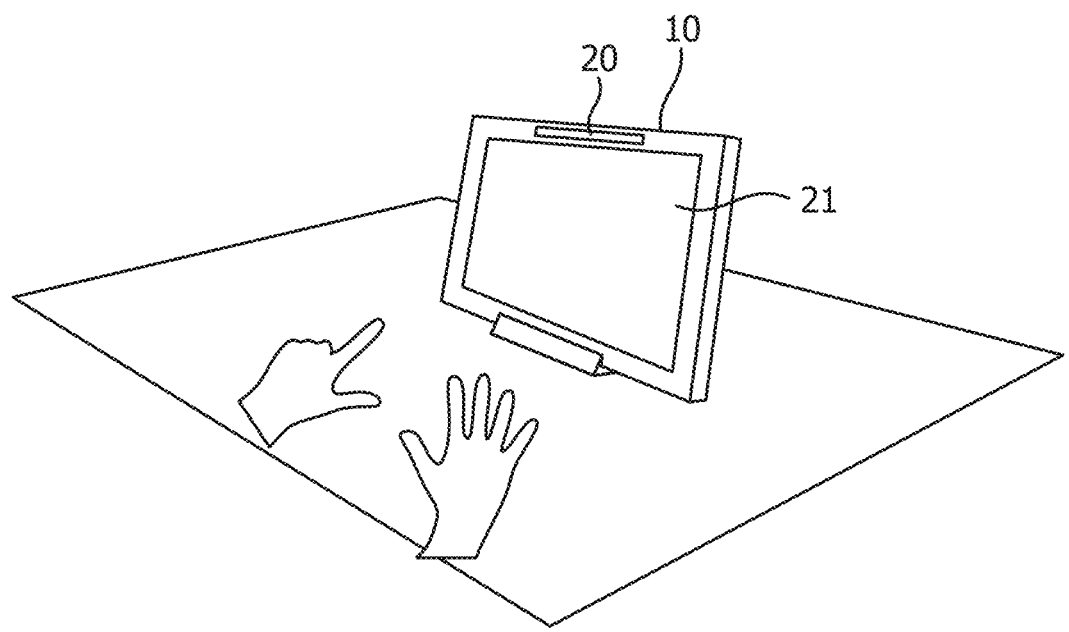
FIG. 2 is a diagram illustrating an example of a usage scenario of a detecting device.

At this point, an example of a usage scenario of the detecting device 10 will be described. FIG. 2 is a diagram illustrating an example of a usage scenario of a detecting device. FIG. 2 illustrates an example of a usage scenario for the case of configuring the detecting device 10 as a tablet. As illustrated in FIG. 2, the detecting device 10 is formed in a planar shape, and is provided with the display unit 21 on one face. In addition, the detecting device 10 is provided with the camera 20 on one edge at the perimeter of the display unit 21. In the example of FIG. 2, the detecting device 10 is held by a stand or the like so that the display face provided with the display unit 21 is visible. The user refers to the display unit 21 from a position facing the display unit 21 of the detecting device 10, and performs various operating instructions via gestures and the like. In the detecting device 10, the user is captured at a predetermined frame rate by the camera 20, the user's hands are detected from the periodically captured image, and a user operation is detected.

Figure 3:
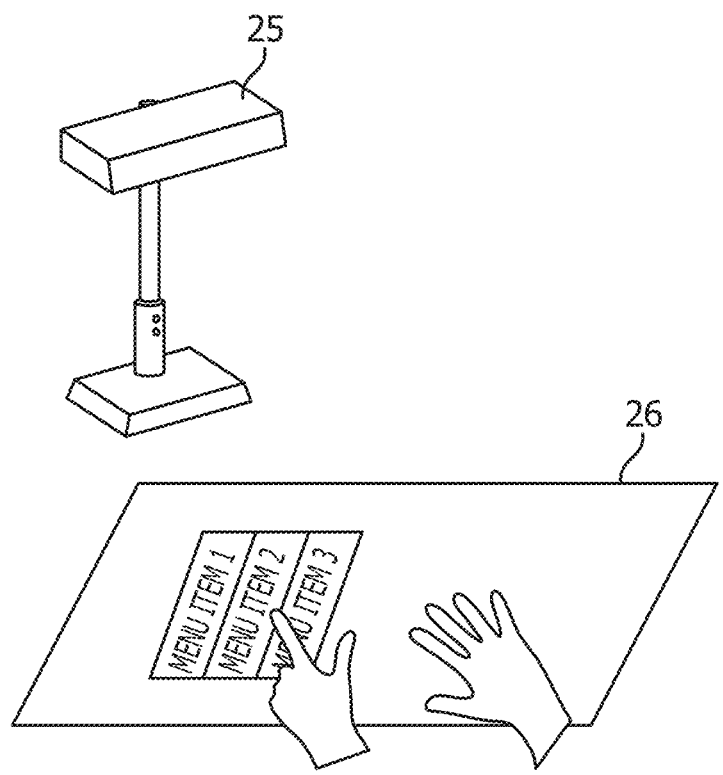
FIG. 3 is a diagram illustrating another example of a usage scenario of a detecting device.

FIG. 3 is a diagram illustrating an example of another usage scenario of a detecting device. FIG. 3 illustrates an example of a usage scenario for the case of projecting an image, and detecting an instruction performed on the projected image. In the example of FIG. 3, the camera 20 and the display unit 21 are provided on a stand 25. The display unit 21 projects an image. The example of FIG. 3 illustrates a case in which the display unit 21 provided on the stand 25 projects an image onto a table, and illustrates a display area 26 where the image is displayed on the table. The user performs various operating instructions on the display area 26 via gestures and the like. The camera 20 provided on the stand 25 captures the display area 26 at a predetermined frame rate. The detecting device 10 detects the user's hands from the periodically captured image, and detects a user operation.

Returning to FIG. 1, the memory unit 22 is a memory device such as flash memory or other semiconductor memory element, a hard disk, or an optical disc. Note that the memory unit 22 may also be rewritable semiconductor memory such as random access memory (RAM) or flash memory.

The memory unit 22 stores an operating system (OS) and various programs executed by the control unit 23. Additionally, the memory unit 22 stores various data used by programs executed by the control unit 23. For example, the memory unit 22 stores hand region information 30.

The hand region information 30 is data storing information related to a hand region included in a captured image. The hand region information 30 is stored by a storing unit 42 discussed later, for example.

The control unit 23 is a device that controls the detecting device 10. For the control unit 23, an electronic circuit such as a central processing unit (CPU) or micro-processing unit (MPU), or an integrated circuit such as an application-specific integrated circuit (ASIC) or a field-programmable gate array (FPGA) may be adopted. The control unit 23 includes internal memory for storing programs defining various processing sequences, and control data, by which various processes are executed. As a result of the operation of the various programs, the control unit 23 functions as various logical processing units. For example, the control unit 23 includes a specifying unit 40, a deciding unit 41, a storing unit 42, a deriving unit 43, a detecting unit 44, and an operation recognizing unit 45.

The specifying unit 40 is a processing unit that specifies various elements. For example, the specifying unit 40 decides a hand region inferred to be a hand based on color information from the image periodically captured by the camera 20. For example, the specifying unit 40 specifies a region corresponding to skin color in the captured image. As an example, the specifying unit 40 converts the color space of the captured image into the color space of the HSV color model. Subsequently, for each pixel in the image with the converted color space, the specifying unit 40 determines whether or not the H, S, and V gradation values satisfy the conditions indicated by the following formulas (1) and (2). The conditions indicated in the formulas (1) and (2) are conditions for determining whether or not a color is a skin color.

$$0.11 < H < 0.22 \quad (1)$$

$$0.2 < S < 0.5 \quad (2)$$

The specifying unit 40 specifies a region of pixels that satisfy the conditions indicated in formulas (1) and (2) as a hand region. Note that the specifying unit 40 may specify the hand region by additionally determining the size of the region of pixels that satisfy the conditions indicated in formulas (1) and (2). For example, if an image depicts a hand, a skin color region of at least a certain size exists. Accordingly, the specifying unit 40 may specify, as the hand region, a region that satisfies the conditions indicated in formulas (1) and (2), and is of at least a predetermined size corresponding to a hand. As a result, if one hand, such as the user's right hand or left hand, is included in the image, one hand region is specified. Meanwhile, if two hands, such as the user's right hand and left hand, are included in the image, two hand regions are specified.

The specifying unit 40 binarizes the captured image into the specified hand region and the region outside the hand region. For example, the specifying unit 40 binarizes the image by treating pixels in the hand region as 1 (black), and pixels in the region outside the hand region as 0 (white). Note that the specifying unit 40 may also conduct the following processes directly on the gradation image, without binarizing the image.

The deciding unit 41 is a processing unit that makes various decisions. For example, if the specifying unit 40 specifies two hand regions, the deciding unit 41 decides which of the two hand regions corresponds to the operating hand, and which of the two hand regions corresponds to the non-operating hand. For example, based on respective movement amounts of the two hand regions within the periodically captured image, the deciding unit 41 may decide that the hand region with the larger movement amount corresponds to the operating hand, while the hand region with the smaller movement amount corresponds to the non-operating hand.

As an example, if two hand regions are specified in the periodically captured image, the deciding unit 41 assigns identification numbers to the hand regions according to the distance within the image from a predetermined edge. For example, in the case of a usage state as illustrated in FIG. 2, for each image, the deciding unit 41 may assign identification numbers in order starting from a predetermined initial value to hand regions in order of closeness to a left edge or a right edge corresponding to the operating user's left and right directions within the image. As a result, for example, if hand regions corresponding to a right hand and a left hand are included in the image, the same identification numbers are assigned respectively to the hand region corresponding to the right hand and the hand region corresponding to the left hand in each image. Note that the deciding unit 41 may also compare the shape of each hand region between images, and assign the same respective identification numbers to hand regions with similar shapes.

Also, for each image, the deciding unit 41 computes a feature point indicating the position of each hand region in the image. For example, the deciding unit 41 computes the center of gravity of a hand region as a feature point. Also, the deciding unit 41 computes a movement amount from changes in the feature point of the hand region assigned with the same identification number in each image.

An example of a movement amount will now be given. For example, if a position within an image is indicated by two-dimensional coordinates according to an X axis and a Y axis, the movement amount is computed from the following formula (3).

$$\text{dis(hand)} = \sqrt{(g(\text{hand},n-1).x - g(\text{hand},n).x)^2 + (g(\text{hand},n-1).y - g(\text{hand},n).y)^2} \quad (3)$$

Herein, "hand" indicates the identification number assigned to a hand region in correspondence with a hand, while "n" indicates the frame number of a captured image. Captured images are assigned frame numbers in the order of capture. The term "g(hand, n)" indicates the center of gravity of the hand region with the identification number "hand" in the image of the nth frame. The term "g(hand, n).x" indicates the X coordinate of the center of gravity, while "g(hand, n).y" indicates the Y coordinate of the center of gravity. In formula (3), the distance from the center of gravity in the image of the preceding frame is computed.

The deciding unit 41 decides that, from among the two hand regions, the hand region with the larger movement amount corresponds to the operating hand, and the hand region with the smaller movement amount corresponds to the non-operating hand. Note that although this practical example computes a movement amount by comparison to the image of the preceding frame, a movement amount may also be computed by comparison to an image preceding by a predetermined number of frames, such as 10 frames before, for example. Also, after deciding the hand region corresponding to the operating hand and the hand region corresponding to the non-operating hand, the deciding unit 41 may also decide that the two hand regions are the same hand regions as in the last frame as long as a predetermined condition holds. For example, the deciding unit 41 may decide that the two hand regions are the same hand regions as in the last frame based on identification number for a predetermined period such as five seconds. As another example, the deciding unit 41 may decide that the two hand regions are the same hand regions as in the last frame based on identification number as long as the movement amounts of the hand region corresponding to the operating hand and the hand region corresponding to the non-operating hand are less than or equal to a predetermined value at which the hands are judged to be still.

At this point, if the user performs an instruction operation, the operating hand that performs the instruction operation moves more than the non-operating hand. For example, if the user performs an instruction operation to specify the position on a target object while holding down the target object, the hand holding down the target object has a small movement amount. Meanwhile, the hand performing the instruction operation has a large movement amount. In this case, the hand holding down the target object is identified as the non-operating hand, while the hand performing the instruction operation is identified as the operating hand.

The storing unit 42 is a processing unit that stores various information. For example, the storing unit 42 stores information related to the operating hand region and the non-operating hand region in the hand region information 30. For example, the storing unit 42 stores a binarized image binarized between the hand region and the non-hand region, and a flag indicating whether a hand region in the image is operating or non-operating, in the hand region information 30. This operating hand region and non-operating hand region information is used to compute the movement amounts of the operating hand region and the non-operating hand region in the next captured image. Also, the non-operating hand region information is used to exclude the non-operating hand region as discussed later. Note that the storing unit 42 may also store hand region edge information in the hand region information 30. In this practical example, the storing unit 42 overwrites information related to a hand region in the hand region information 30. For this reason, in this practical example, only information related to the hand regions in the most recent frame are stored in the hand region information 30. Note that the storing unit 42 may also be configured to successively add information related to hand regions and store information related to the hand regions in each frame in the hand region information 30.

The deriving unit 43 is a processing unit that conducts various derivations. For example, the deriving unit 43 determines, from each image captured by the camera 20, whether or not two hand regions specified by the specifying unit 40 are joined. For example, if the number of hand regions specified by the specifying unit 40 changes from 2 to 1, the deriving unit 43 determines that the two hand regions are joined. When the two hand regions are joined, the deriving unit 43 derives a region obtained by excluding a range stored in the hand region information 30 of the memory unit 22 from the joined hand region until the number of hand regions becomes a number other than 1. For example, the deriving unit 43 derives the region that remains after masking the range stored in the hand region information 30 from the joined hand region.

The detecting unit 44 is a processing unit that conducts various detection processes. For example, the detecting unit 44 detects a predetermined recognition site included in a hand from a hand region in an image. For example, the detecting unit 44 conducts predetermined detection processes such as pattern matching and edge detection on a hand region, and detects a fingertip of a hand as the recognition site. If there are two hand regions specified by the specifying unit 40, the detecting unit 44 detects a fingertip from the hand region decided as the operating hand region by the deciding unit 41. Also, if the number of hand regions specified by the specifying unit 40 changes from 2 to 1, the detecting unit 44 detects a fingertip from a region derived by the deriving unit 43, until the number of hand regions becomes a number other than 1. Also, if there is one hand region specified in the captured images from the beginning, the detecting unit 44 detects a fingertip from that hand region.

The operation recognizing unit 45 is a processing unit that recognizes various user operations. For example, the operation recognizing unit 45 recognizes operation content from the position of a fingertip detected by the detecting unit 44. For example, if the position of the fingertip is positioned in a selection region within an image, the operation recognizing unit 45 recognizes an operation of selecting the selection region. For example, the memory unit 22 may be configured to store information associating the position of a fingertip on-screen or the trail of the position of the fingertip with operation content, and the operation recognizing unit 45 may recognize the operation content corresponding to the position of the fingertip or the trail of the position of the fingertip.

In addition, the operation recognizing unit 45 may also recognize various user operations by computing the three-dimensional position of the fingertip. For example, if the detecting device 10 is provided with two cameras 20 having a predetermined spacing and overlapping image capture regions, the operation recognizing unit 45 may compute a three-dimensional position from the parallax of a target object within images captured by the two cameras 20, and detect a user operation from changes in the three-dimensional position. For example, the operation recognizing unit 45 may recognize a fingertip and compute a three-dimensional position of the fingertip, and detect a touch operation on the display area 26 from the three-dimensional position, for example. For example, if the two cameras 20 are installed in parallel, the parallax may be computed using only the discrepancy on the horizontal axis in the images captured by the two cameras 20.

[Device Operation]

Figure 4:
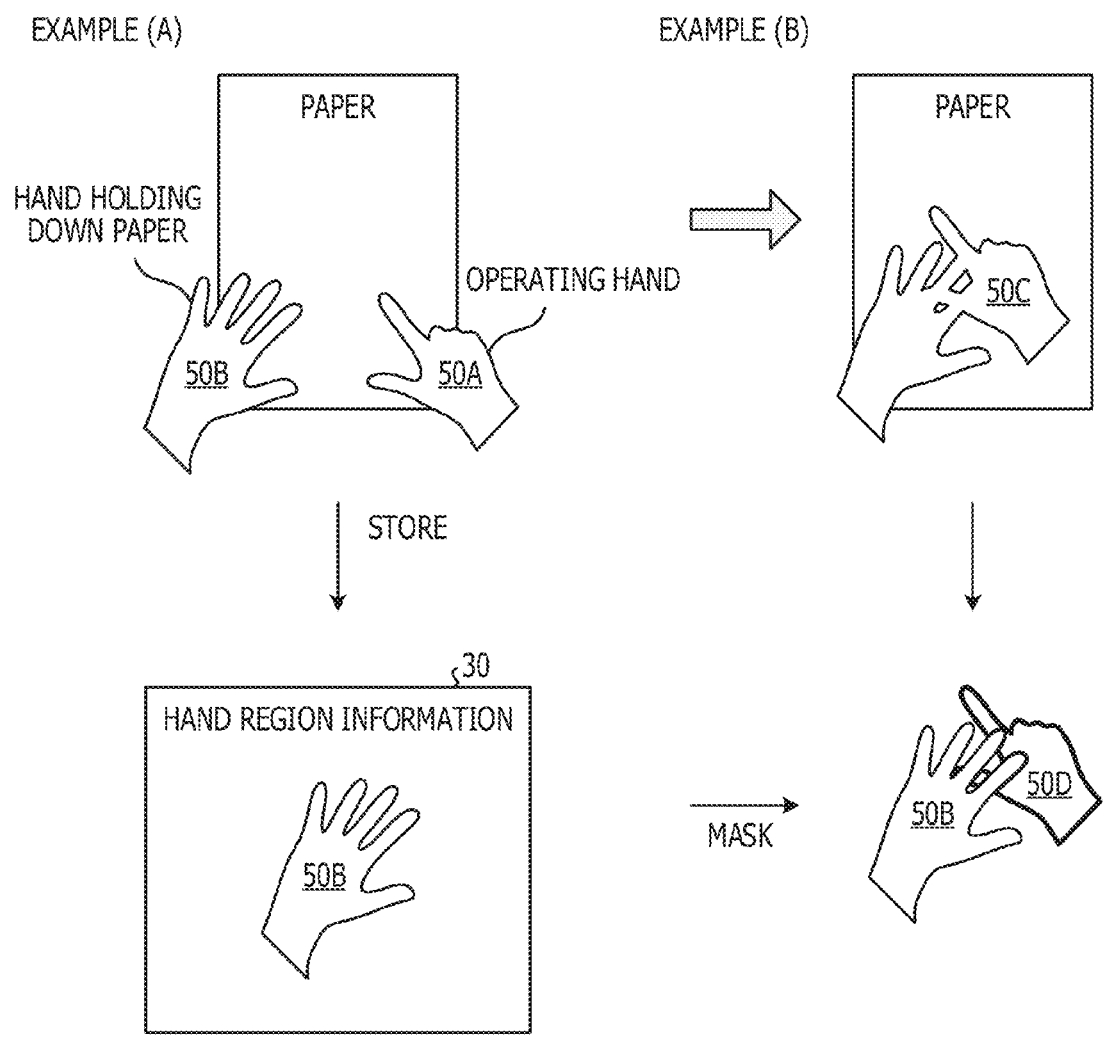
FIG. 4 is a diagram schematically illustrating an example of a flow of operations conducted when detecting a user operation.

Next, operations conducted when the detecting device 10 according to this practical example detects a user operation will be described. FIG. 4 is a diagram schematically illustrating an example of a flow of operations conducted when detecting a user operation.

The example of (A) of FIG. 4 illustrates a state in which the user is performing an operation of specifying a position on a sheet of paper while holding down the sheet of paper. When an image of the state illustrated in (A) of FIG. 4 is captured, the specifying unit 40 of the detecting device 10 specifies two hand regions 50A and 50B. When the user specifies a position on the sheet of paper while holding down the sheet of paper, the hand holding down the sheet of paper moves only slightly, and the movement amount is small. Meanwhile, the hand performing the operation of specifying a position has a large movement amount. For this reason, the deciding unit 41 decides that the hand region 50A is the operating hand region, and decides that the hand region 50B is the non-operating hand region. The storing unit 42 stores information indicating the ranges of the operating hand region 50A and the non-operating hand region 50B in the hand region information 30. In the example of (A) of FIG. 4, information indicating the range of the non-operating hand region 50B is stored in the hand region information 30.

The example of (B) of FIG. 4 illustrates a state in which the user's hand that is holding down the sheet of paper is overlapping the user's hand that is performing the operation of specifying a position on the sheet of paper. When an image of the state illustrated in (B) of FIG. 4 is captured, the specifying unit 40 of the detecting device 10 specifies one hand region 50C. When the number of hand regions changes from 2 to 1, the deriving unit 43 derives the region 50D that remains after masking the range of the hand region 50B stored in the hand region information 30 from the hand region 50C. The detecting unit 44 detects a fingertip from the region 50D.

Figure 5:
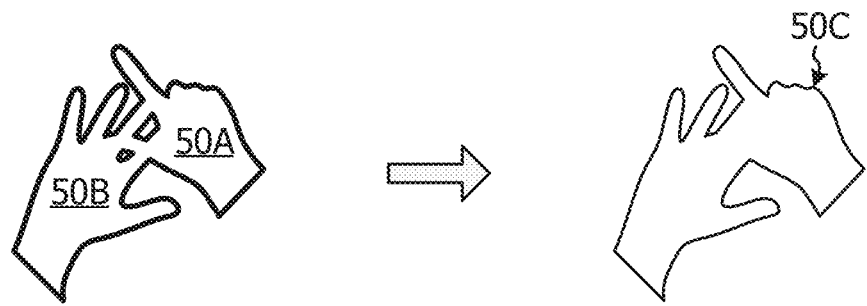
FIG. 5 is a diagram illustrating an example of a change in region shape in the case of overlap between two hand regions.

At this point, if an image depicts two hands and there is overlap between the regions of the hands, detecting a fingertip according to changes in the shape of the regions of the hands is difficult. FIG. 5 is a diagram illustrating an example of a change in region shape in the case of overlap between two hand regions. As illustrated in FIG. 5, since the hand region 50C formed by the overlapping hand regions 50A and 50B changes shape, detecting a site such as a fingertip is difficult. Consequently, by removing the hand region 50B of the hand that is holding down the sheet of paper from the hand region 50C, a site such as a fingertip becomes may be detected more accurately compared to the case of not removing the hand region 50B. In other words, reductions in detection accuracy may be moderated.

Meanwhile, when the user specifies a position using both hands, the parts that specifies the position does not overlap, even if the hand specifying a position partially overlaps the other hand. For example, when the user specifies a position while holding down the sheet of paper, as illustrated in FIG. 4, if the hand that specifies the position were completely overlapped with the other hand, the operating fingertip would be separated from the sheet of paper, and thus the part that specifies a position does not overlap. Consequently, when the hand regions are overlapping, by removing the hand region of the hand that is holding down the sheet of paper, a site such as a fingertip may be detected more accurately compared to the case of not removing the hand region of the hand that is holding down the sheet of paper, even if the entire hand region of the hand holding down the sheet of paper is not distinguished exactly.

[Process Flows]

Figure 6:
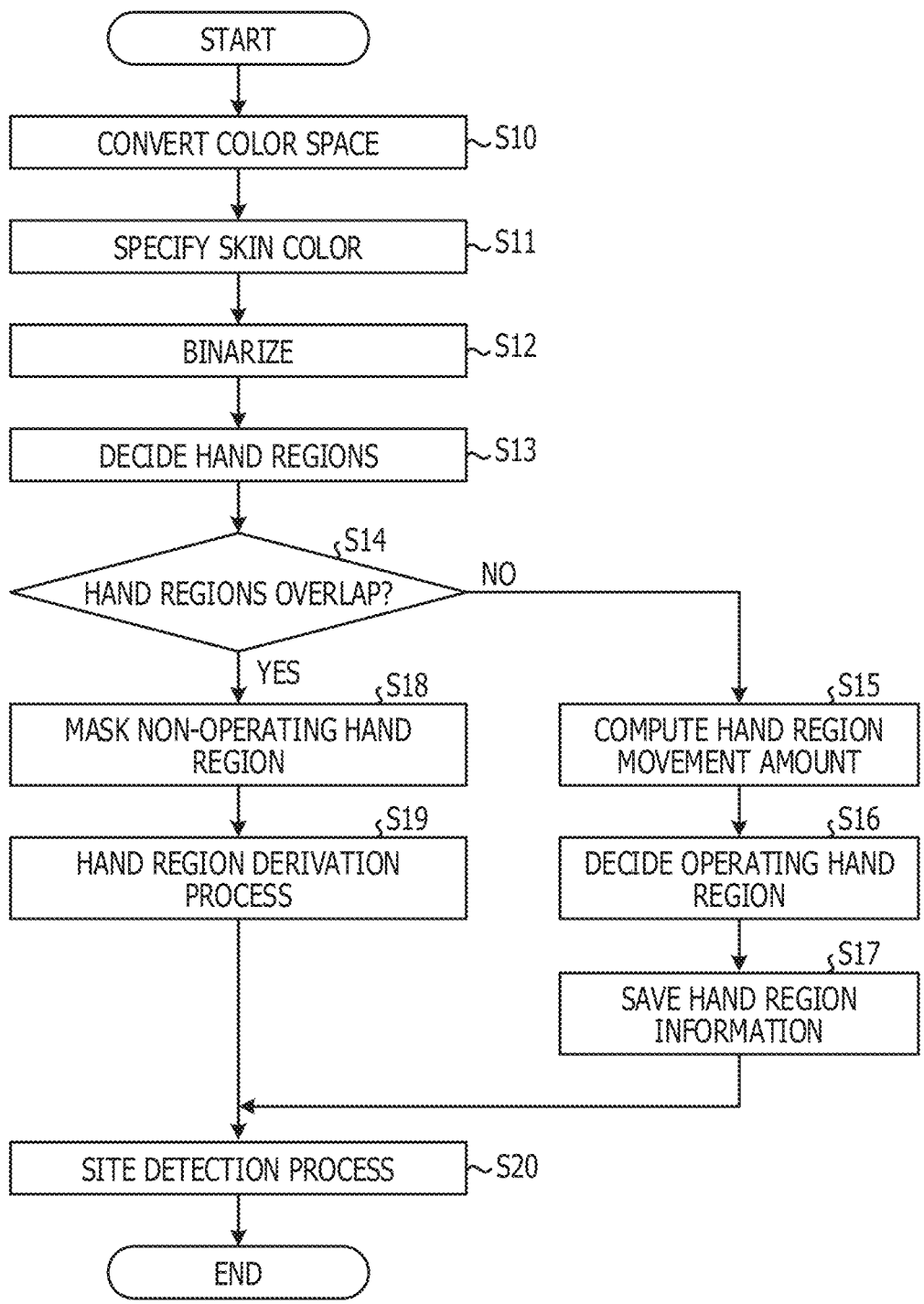
FIG. 6 is a flowchart illustrating an example of a detection processing sequence.

First, the flow of a detection process in which the detecting device 10 according to this practical example detects a recognition site included in a region of a hand from an image will be described. FIG. 6 is a flowchart illustrating an example of a detection processing sequence. The detection process is executed at a predetermined timing, such as every time an image is captured, for example.

As illustrated in FIG. 6, the specifying unit 40 converts the color space of the captured image into the color space of the HSV color model (S10). Subsequently, the specifying unit 40 specifies a skin color region in which the pixels of the image with the converted color space satisfy the conditions indicated in formulas (1) and (2) discussed earlier (S11). The specifying unit 40 binarizes the captured image by treating pixels in the skin color region as 1 (black), and pixels in the region outside the skin color region as 0 (white) (S12). The specifying unit 40 decides that a region of at least a predetermined size corresponding to a hand and including pixels that are 1 (black) is a hand region (S13). Consequently, if the image depicts two hands, two hand regions are specified.

The deriving unit 43 determines whether or not the hand regions overlap (S14). For example, if two hand regions join and the number of hand regions becomes 1, the deriving unit 43 determines that the hand regions overlap. If the hand regions do not overlap (S14, No), the deciding unit 41 assigns identification numbers to the hand regions according to the distance within the image from a predetermined edge, and computes the movement amount of the hand region assigned with the same identification number from the preceding captured image (S15). The deciding unit 41 decides that the hand region with the larger movement amount is the operating hand region, and the hand region with the smaller movement amount is the non-operating hand region (S16). The storing unit 42 stores a binarized image binarized between the hand region and the non-hand region, and a flag indicating whether a hand region in the image is operating or non-operating, in the hand region information 30 (S17).

Meanwhile, if the hand regions overlap (S14, Yes), the deriving unit 43 masks the range of the non-operating hand region stored in the hand region information 30 from the joined hand region (S18). Subsequently, the deriving unit 43 derives the remaining region after removing the masked range from the joined hand region (S19).

The detecting unit 44 treats the operating hand region decided in the above S16 or the region derived in the above S19 as the target region in which to detect a user operation, conducts a target site detection process that detects a predetermined recognition site (S20), and ends the process.

Figure 7:
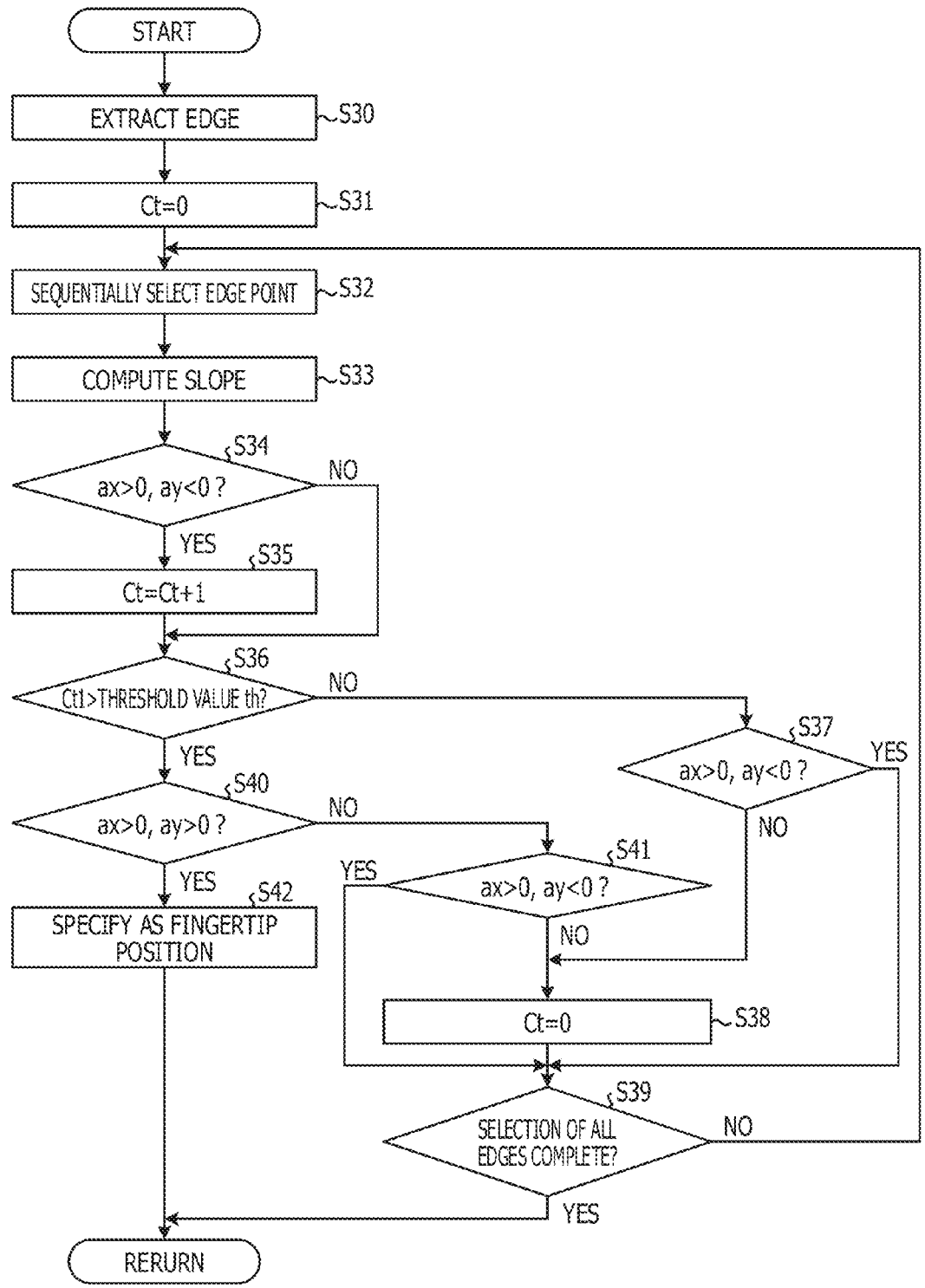
FIG. 7 is a flowchart illustrating an example of a target site detection processing sequence.

Next, the flow of a target site detection process according to this practical example will be described. FIG. 7 is a flowchart illustrating an example of a target site detection processing sequence. The target site detection process is executed at a predetermined timing, such as in S20 of the detection process, for example. Note that this practical example describes as an example the case of detecting an edge to detect a fingertip as the recognition site.

Figure 8:
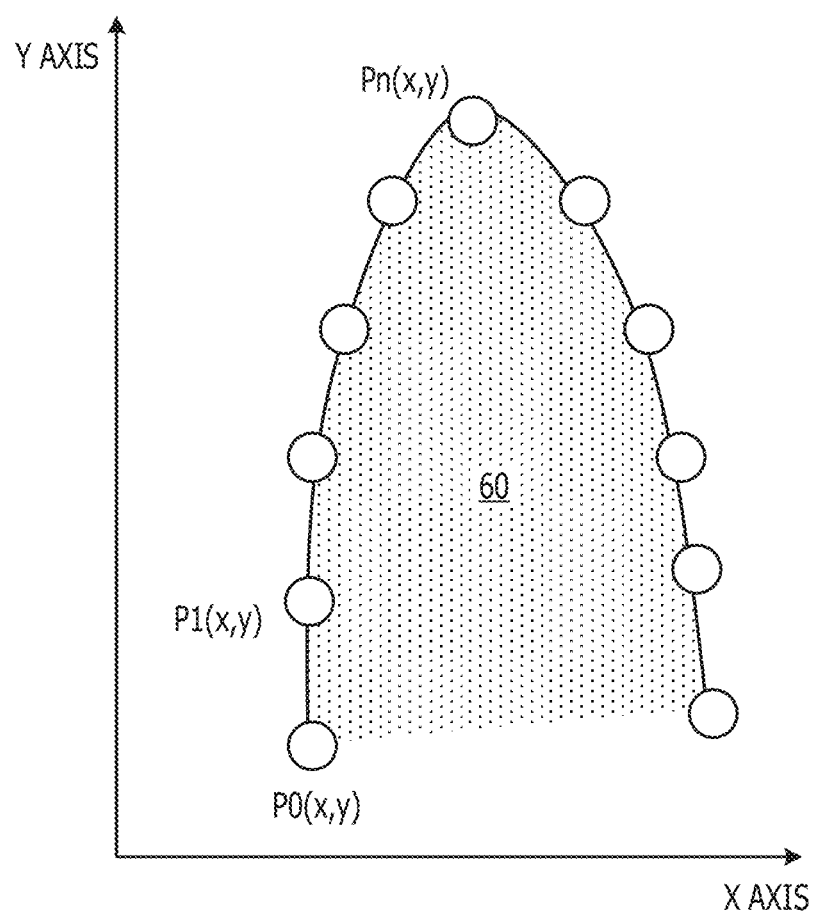
FIG. 8 is a diagram illustrating an example of an extracted edge.

The detecting unit 44 extracts an edge from the target region in which to detect a user operation (S30). FIG. 8 is a diagram illustrating an example of an extracted edge. FIG. 8 illustrates an X axis and a Y axis for indicating position within the image. The X axis is defined so that the value increases from left to right. The Y axis is defined so that the value increases from top to bottom. FIG. 8 also illustrates multiple edge points P. The edge points P are assigned a number n sequentially from 0 along the edge. Hereinafter, the nth edge point P is designated the edge point Pn. Also, the coordinates of the edge point Pn are designated Pn(x, y).

The detecting unit 44 initializes to zero a variable Ct that stores a length (S31). The detecting unit 44 selects an edge point P along the edge (S32). In this practical example, the edge points P are selected sequentially along the edge starting from the first edge point PO. The detecting unit 44 computes the slope to the next edge point along the edge (S33). In this practical example, the X-axis increase ax and the Y-axis increase ay to the next edge point are computed as the slope. Subsequently, the detecting unit 44 determines if the increase ax>0 and the increase ay<0 (S34). In the example of FIG. 8, the processing of S34 determines whether or not the selected edge point P is an edge point P on the left side of the target region 60 in which to detect a user operation, for example.

If the increase ax>0 and the increase ay<0 (S34, Yes), the detecting unit 44 adds 1 to the value of the variable Ct (S35), and proceeds to S36 discussed later. Meanwhile, if it is not true that the increase ax>0 and the increase ay<0 (S34, No), the process proceeds to S36 discussed later.

The detecting unit 44 determines whether or not the variable of the variable Ct is greater than a predetermined threshold value th at which the length may be judged to be the length of a finger (S36). If the value of the variable Ct is less than or equal to the threshold value th (S36, No), the detecting unit 44 determines if the increase ax>0 and the increase ay<0 (S37). If the increase ax>0 and the increase ay<0 (S37, Yes), the process proceeds to S39 discussed later. Meanwhile, if it is not true that the increase ax>0 and the increase ay<0 (S37, No), the variable Ct is initialized to zero (S38), and the process proceeds to S39 discussed later. In the example of FIG. 8, the processing in S37 and S38 continues the process if the selected edge point P is an edge point P on the left side of the region 60, and initializes the variable Ct to zero if the selected edge point P is an edge point P on the right side of the region 60.

The detecting unit 44 determines whether or not the sequential selection of all edge points P along the edge is complete (S39). If the selection of all edge points P is not complete (S39, No), the process proceeds to S32 above. Meanwhile, if the selection of all edge points P is complete (S39, Yes), the process ends.

Meanwhile, if the value of the variable Ct is greater than the threshold value th (S36, Yes), the detecting unit 44 determines if the increase ax>0 and the increase ay>0 (S40). In the example of FIG. 8, the processing of S40 determines whether or not the selected edge point P is the edge point Pn at the apex of the region 60 where the increase ax>0 and the increase ay>0 first becomes true. If it is not true that the increase ax>0 and the increase ay>0 (S40, No), the detecting unit 44 determines if the increase ax>0 and the increase ay<0 (S41). If the increase ax>0 and the increase ay<0 (S41, Yes), the process proceeds to S38 above. Meanwhile, if it is not true that the increase ax>0 and the increase ay<0 (S41, No), the process proceeds to S39 above.

Meanwhile, if the increase ax>0 and the increase ay>0 (S40, Yes), the selected edge point P is the apex of the region 60, and thus the detecting unit 44 treats the selected edge point P as the position of the fingertip (S42), and ends the process. According to this target site detection process, the position of the fingertip is detected.

Advantageous Effects

As discussed above, the detecting device 10 according to this practical example specifies a hand region from a captured image. Based on the movement amount of the specified region, the detecting device 10 specifies a non-operating hand region with a small movement amount and an operating hand region with a larger movement amount than the non-operating hand region. If the decided non-operating hand region and the operating hand region are captured in a joined state, the detecting device 10 derives a region that remains after removing the non-operating hand region from the captured image. The detecting device 10 conducts a detection process on the image of the derived region. As a result, the detecting device 10 is able to moderate reductions in detection accuracy.

In addition, the detecting device 10 according to this practical example stores a range decided to be the non-operating hand region. The detecting device 10 masks the stored non-operating hand region to derive the region that remains after removing the non-operating hand region from the captured image. As a result, the detecting device 10 is able to remove the non-operating hand region, even when the non-operating hand region and the operating hand region are joined.

In addition, the detecting device 10 according to this practical example sequentially assigns identification numbers to specified hand regions in order of closeness to a predetermined edge in the image for each periodically captured image, and computes the movement amount of the hand region assigned with the same identification number in each image. As a result, the detecting device 10 is able to compute the movement amount of each hand region from the periodically captured image.

Practical Example 2

Although the foregoing describes a practical example related to a device according to the disclosure, the disclosed technology encompasses carrying out various different embodiments other than the practical example discussed in the foregoing. Accordingly, other practical examples included in the present disclosure will be described hereinafter.

For example, although the above practical example describes a case of specifying a skin color region by converting a captured image into the color space of the HSV color model, the disclosed device is not limited thereto. The color space used to specify a hand region may be any color space by which a region corresponding to skin color in an image may be specified. For example, the specifying unit 40 may also determine a region corresponding to skin color in an image by converting the color space of the captured image to the YCbCr color space.

Also, although the above practical example describes a case of extracting an edge from a target region in which to detect a user operation, and detecting a fingertip as the recognition site, the disclosed device is not limited thereto.

For example, a fingertip may also be detected by conducting template matching of a template indicating the shape of a finger on the target region in which to detect a user operation.

Also, although the above practical example describes a case of computing the center of gravity as a feature point indicating the position of a hand region, and computing the movement amount of the center of gravity as the movement amount of the hand region, the disclosed device is not limited thereto. For example, the center point of a square or circular region inscribing a hand region may be computed as a feature point indicating the position of the hand region, and the movement amount of the center point may be computed as the movement amount of the hand region. As another example, the position of the outermost end of the hand region in a predetermined direction may be computed as a feature point indicating the position of the hand region, and the movement amount of the position of the end may be computed as the movement amount of the hand region.

Furthermore, the structural elements of respective devices illustrated in the drawings are functional and conceptual illustrations, and are not limited to being physically configured exactly as depicted in the drawings. In other words, the specific state in which respective devices are separated or joined is not limited to that illustrated in the drawings, and all or part thereof may be functionally or physically separated or joined in arbitrary units according to factors such as various loads and usage conditions. For example, the respective processing units of the detecting device 10, including the specifying unit 40, deciding unit 41, storing unit 42, deriving unit 43, detecting unit 44, and operation recognizing unit 45, may be joined as appropriate. In addition, the processes of each processing unit may also be separated into the processes of multiple processing units as appropriate. Also, in each device, all or part of the respective processing units may be joined as appropriate. Furthermore, all or an arbitrary part of the respective processing functions conducted by the respective processing units may be realized by a CPU and a program analytically executed by the CPU, or alternatively, realized as hardware by wired logic.

[Detecting Program]

Figure 9:
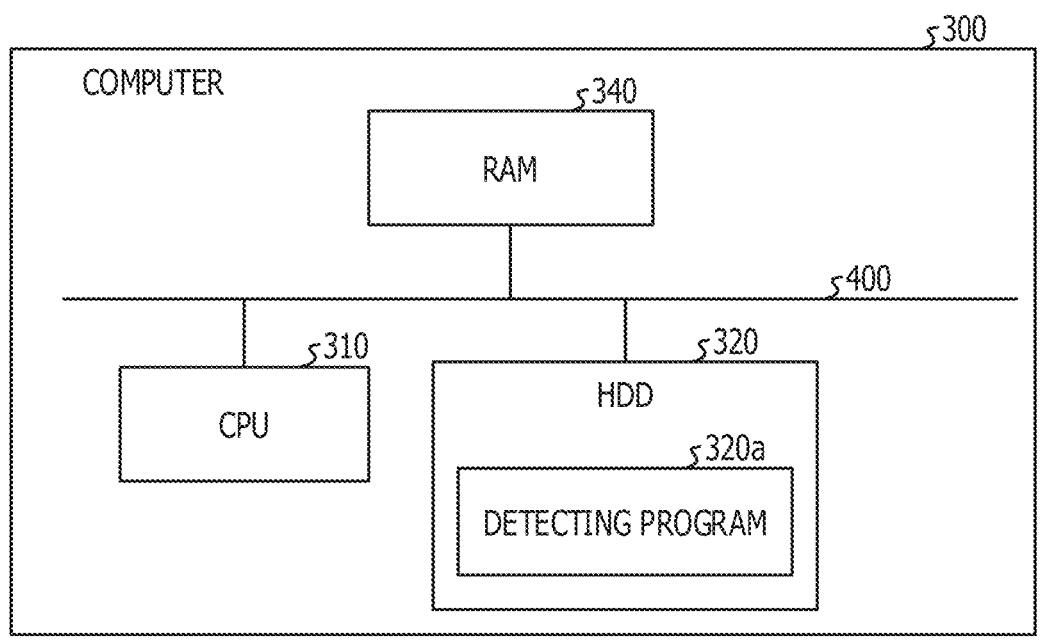
FIG. 9 is a diagram illustrating a computer that executes a detecting program.

Moreover, it is also possible to realize the various processes described in the foregoing practical examples by executing a program prepared in advance on a computer system such as a personal computer or workstation. Accordingly, an example of a computer system that executes a program having functions similar to those of the foregoing practical examples will be described hereinafter. FIG. 9 is a diagram illustrating a computer that executes a detecting program.

As illustrated in FIG. 9, a computer 300 includes a central processing unit (CPU) 310, a hard disk drive (HDD) 320, and random access memory (RAM) 340. The above components 300 to 340 are connected to each other via a bus 400.

The HDD 320 stores in advance a detecting program 320a that exhibits functions similar to the processing units of the foregoing detecting device 10. Note that the detecting program 320a may also be separated as appropriate.

The HDD 320 also stores various information. For example, the HDD 320 stores various data used by an OS and processes.

The CPU 310 executes operations similar to the processing units of the practical examples by reading out the detecting program 320a from the HDD 320, and executing the detecting program 320a. In other words, the detecting program 320a executes operations similar to the processing units of the detecting device 10.

Note that the above detecting program 320a is not limited to being stored in the HDD 320 from the beginning.

For example, a program may be stored on a portable physical medium such as a flexible disk (FD), CD-ROM, DVD disc, magneto-optical disc, or IC card inserted into the computer 300. The computer 300 may then retrieve the program therefrom and execute the program.

Furthermore, a program may be stored in a device such as another computer (or server) connected to the computer 300 via a public network, the Internet, a LAN, or a WAN. The computer 300 may then retrieve the program therefrom and execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An apparatus comprising:
    at least one memory; and
    at least one processor coupled to the at least one memory, the at least one processor configured to cause the following to be performed:
        specifying a first region corresponding to a first hand and a second region corresponding to a second hand in a captured image,
        determining a movement amount of the first region and a movement amount of the second region,
        determining a region of the first region and the second region having a larger movement amount, the determined region of the first region and the second region thereby being a larger movement region, and the other region of the first region and the second region thereby being a smaller movement region,
        determining a position pointed by a finger of the hand of the first hand and the second hand to which the region of the first region and the second region that is the larger movement region corresponds, wherein
            when the first region and the second region are separate in the captured image, the position pointed by the finger is determined from the larger movement region, and
            when the first region and the second region are included in a joined image, in which the first region and the second region are joined, in the captured image, the position pointed by the finger is determined from the joined region having the smaller movement region removed from the joined region.

2. The apparatus according to claim 1, wherein the at least one processor is configured to cause the following to be performed:
    storing, in a storage unit, a range of the smaller movement region,
    wherein, when the first region and the second region are included in the joined image in the captured image, the smaller movement region is removed from the joined region by masking the range of the smaller movement region stored in the storing unit.

3. The device according to claim 1, wherein the image is periodically captured, and the at least one processor is configured to cause the following to be performed:
sequentially assigning identification numbers to the first region in order of closeness to an edge in the image for each periodically captured image, and
sequentially assigning identification numbers to the second region in order of closeness to an edge in the image for each periodically captured image,
wherein the determining the movement amount determines the movement amount of the first region based on the identification numbers assigned to the first region, and determines the movement amount of the second region based on the identification numbers assigned to the second region.

4. A method comprising:
by at least one computer processor executing instructions stored in at least one memory:
specifying a first region corresponding to a first hand and a second region corresponding to a second hand in a captured image;
determining a movement amount of the first region and a movement amount of the second region;
determining a region of the first region and the second region having a larger movement amount, the determined region of the first region and the second region thereby being a larger movement region, and the other region of the first region and the second region thereby being a smaller movement region; and
determining a position pointed by a finger of the hand of the first hand and the second hand to which the region of the first region and the second region that is the larger movement region corresponds, wherein
when the first region and the second region are separate in the captured image the position pointed by the finger is determined from the larger movement region, and
when the first region and the second region are included in a joined image, in which the first region and the second region are joined in the captured image, the position pointed by the finger is determined from the joined region having the smaller movement region removed from the joined region.

5. The method according to claim 4, further comprising:
by the at least one processor executing the instructions stored in the at least one memory:
storing, in a storage unit, a range of the smaller movement region,
wherein, when the first region and the second region are included in the joined image in the captured image, the smaller movement region is removed from the joined region by masking the range of the smaller movement region stored in the storing unit.

6. The method according to claim 4, wherein the image is periodically captured, and the method further comprises:
by the at least one processor executing the instructions stored in the at least one memory:
sequentially assigning identification numbers to first region in order of closeness to an edge in the image for each periodically captured image, and
sequentially assigning identification numbers to the second region in order of closeness to an edge in the image for each periodically captured image,
wherein the determining the movement amount determines the movement amount of the first region based on the identification numbers assigned to the first region, and determines the movement amount of the second region based on the identification numbers assigned to the second region.

7. A computer-readable storage medium storing a program that causes a computer to execute a process comprising:
specifying a first region corresponding to a first hand and a second region corresponding to a second hand in a captured image;
determining a movement amount of the first region and a movement amount of the second region,
determining a region of the first region and the second region having a larger movement amount, the determined region of the first region and the second region thereby being a larger movement region, and the other region of the first region and the second region thereby being a smaller movement region,
determining a position pointed by a finger of the hand of the first hand and the second hand to which the region of the first region and the second region that is the larger movement region corresponds, wherein
when the first region and the second region are separate in the captured image, the position pointed by the finger is determined from the larger movement region, and
when the first region and the second region are included in a joined image, in which the first region and the second region are joined, in the captured image, the position pointed by the finger is determined from the joined region having the smaller movement region removed from the joined region.

8. The computer-readable storage medium according to claim 7, wherein the process further comprises:
storing, in a storage unit, a range of the smaller movement region,
wherein, when the first region and the second region are included in the joined image in the captured image, the smaller movement region is removed from the joined region by masking the range of the smaller movement region stored in the storage unit.

9. The computer-readable storage medium according to claim 7, wherein the image is periodically captured, and the process further comprises:
sequentially assigning identification numbers to the first region in order of closeness to an edge in the image for each periodically captured image, and
sequentially assigning identification numbers to the second region in order of closeness to an edge in the image for each periodically captured image,
wherein the determining the movement amount determines the movement amount of the first region based on the identification numbers assigned to the first region, and determines the movement amount of the second region based on the identification numbers assigned to the second region.

* * * * *